(12) United States Patent
Yasuda

(10) Patent No.: US 8,726,288 B2
(45) Date of Patent: May 13, 2014

(54) IMPROVING DATA PROCESSING EFFICIENCY BASED ON DATA BEHAVIOR TYPE

(75) Inventor: Junichi Yasuda, Tokyo (JP)

(73) Assignee: NEC Corporation, Tokyo (JP)

( * ) Notice: Subject to any disclaimer, the term of this patent is extended or adjusted under 35 U.S.C. 154(b) by 142 days.

(21) Appl. No.: 13/351,404

(22) Filed: Jan. 17, 2012

(65) Prior Publication Data

US 2012/0192196 A1 Jul. 26, 2012

(30) Foreign Application Priority Data

Jan. 20, 2011 (JP) ................................ 2011-009871

(51) Int. Cl.
*G06F 9/46* (2006.01)
(52) U.S. Cl.
USPC ........................................................ 718/103
(58) Field of Classification Search
USPC ........................................................ 718/103
See application file for complete search history.

(56) References Cited

U.S. PATENT DOCUMENTS

| 5,655,102 A * | 8/1997 | Galles ........................... 711/150 |
| 2003/0002508 A1* | 1/2003 | Dierks et al. ............. 370/395.52 |
| 2003/0033461 A1* | 2/2003 | Malik et al. .................... 710/107 |
| 2003/0200252 A1* | 10/2003 | Krum ............................ 709/102 |

FOREIGN PATENT DOCUMENTS

JP 2009211426 A 9/2009

\* cited by examiner

*Primary Examiner* — Meng An
*Assistant Examiner* — James J Lee
(74) *Attorney, Agent, or Firm* — Sughrue Mion, PLLC

(57) ABSTRACT

In order to improve processing efficiency, a command execution device includes: a behavior type decision unit which decides a behavior type indicating the content of a data input/output operation, according to the content of data processing executed by an entered command; a command storage unit which refers to setting information set in advance for each of the behavior types, and stores the command in a command queue created for each priority level, based on the priority level included in the setting information; and a command execution unit which fetches, out of commands stored in the command queue, a command stored in a section of the command queue having the highest priority level from the command queue, and executes the command.

13 Claims, 15 Drawing Sheets

FIG. 2

| DATA A (SRO) ||
|---|---|
| EMPLOYEE NUMBER | SALARY |
| 1 | 999,999 |
| 2 | 999,999 |
| 3 | 999,999 |
| ⋮ | ⋮ |

FIG. 3

| DATA B (SWO) ||
|---|---|
| EMPLOYEE NUMBER | INTERIM INSURANCE PREMIUM |
| 1 | 99,999 |
| 2 | 99,999 |
| 3 | 99,999 |
| ⋮ | ⋮ |

FIG. 4

| SETTING INFORMATION ||| 
|---|---|---|
| BEHAVIOR TYPE | SETTING CONTENT ||
| SRO | BEHAVIOR | SEQUENTIAL READ-AHEAD |
| | COMMAND | DATA SIZE = 10, PRIORITY LEVEL = HIGH |
| | RESPONSE | DATA SIZE = 100, PRIORITY LEVEL = LOW |
| | NUMBER OF READ-AHEAD DATA | 10 |
| | COMMUNICATION MODULE | COMMUNICATION MODULE 34 |
| | COMMUNICATION METHOD | Socket |
| SWO | BEHAVIOR | SEQUENTIAL WRITE-THROUGH |
| | COMMAND | DATA SIZE = 500, PRIORITY LEVEL = MID- |
| | RESPONSE | DATA SIZE = 10, PRIORITY LEVEL = HIGH |
| | NUMBER OF COPIES | 2 |
| | COMMUNICATION MODULE | COMMUNICATION MODULE 36 |
| | COMMUNICATION METHOD | Socket |

FIG. 5

| | COMMUNICATION MODULE SETTING | |
|---|---|---|
| | BUFFER | SETTING |
| 1 | SRO; TRANSMIT BUFFER 341 | BUFFER SIZE = 10, PRIORITY LEVEL = HIGH |
| 2 | SRO; RECEIVE BUFFER 342 | BUFFER SIZE = 1000, PRIORITY LEVEL = LOW |
| 3 | SWO; TRANSMIT BUFFER 361 | BUFFER SIZE = 500, PRIORITY LEVEL = MID- |
| 4 | SWO; RECEIVE BUFFER 362 | BUFFER SIZE = 10, PRIORITY LEVEL = HIGH |

FIG. 10

| SETTING INFORMATION | | |
|---|---|---|
| BEHAVIOR TYPE | SETTING CONTENT | |
| CONTROL | BEHAVIOR | FOR CONTROL |
| | COMMAND (C → S) | DATA SIZE = 3, PRIORITY LEVEL = HIGHEST |
| | RESPONSE (S → C) | DATA SIZE = 3, PRIORITY LEVEL = HIGHEST |
| | NUMBER OF CONTROL COMMAND BUFFERS | 10 |
| | COMMUNICATION MODULE | COMMUNICATION MODULE 32C |
| | COMMUNICATION METHOD | Socket |
| SRO | BEHAVIOR | SEQUENTIAL READ-AHEAD |
| | COMMAND (C → S) | DATA SIZE = 10, PRIORITY LEVEL = HIGH |
| | RESPONSE (S → C) | DATA SIZE = 100, PRIORITY LEVEL = LOW |
| | NUMBER OF READ-AHEAD DATA | 10 |
| | COMMUNICATION MODULE | COMMUNICATION MODULE 34C |
| | COMMUNICATION METHOD | Socket |
| SWO | BEHAVIOR | SEQUENTIAL WRITE-THROUGH |
| | COMMAND (C → S) | DATA SIZE = 500, PRIORITY LEVEL = MID- |
| | RESPONSE (S → C) | DATA SIZE = 10, PRIORITY LEVEL = HIGH |
| | NUMBER OF COPIES | 2 |
| | COMMUNICATION MODULE | COMMUNICATION MODULE 36C |
| | COMMUNICATION METHOD | Socket |

FIG. 11

| | BUFFER | SETTING |
|---|---|---|
| | \multicolumn{2}{c}{COMMUNICATION MODULE SETTING (COMMAND EXECUTION CLIENT)} |

| | BUFFER | SETTING |
|---|---|---|
| 1 | CONTROL; TRANSMIT BUFFER 321C | BUFFER SIZE = 30, PRIORITY LEVEL = HIGHEST |
| 2 | CONTROL; RECEIVE BUFFER 322C | BUFFER SIZE = 30, PRIORITY LEVEL = HIGHEST |
| 3 | SRO; TRANSMIT BUFFER 341C | BUFFER SIZE = 10, PRIORITY LEVEL = HIGH |
| 4 | SRO; RECEIVE BUFFER 342C | BUFFER SIZE = 1000, PRIORITY LEVEL = LOW |
| 5 | SWO; TRANSMIT BUFFER 361C | BUFFER SIZE = 500, PRIORITY LEVEL = MID- |
| 6 | SWO; RECEIVE BUFFER 362C | BUFFER SIZE = 10, PRIORITY LEVEL = HIGH |

FIG. 12

| | COMMUNICATION MODULE SETTING (COMMAND EXECUTION SERVER) | |
|---|---|---|
| | BUFFER | SETTING |
| 1 | CONTROL; TRANSMIT BUFFER 321S | BUFFER SIZE = 30, PRIORITY LEVEL = HIGHEST |
| 2 | CONTROL; RECEIVE BUFFER 322S | BUFFER SIZE = 30, PRIORITY LEVEL = HIGHEST |
| 3 | SRO; TRANSMIT BUFFER 341S | BUFFER SIZE = 1000, PRIORITY LEVEL = LOW |
| 4 | SRO; RECEIVE BUFFER 342S | BUFFER SIZE = 10, PRIORITY LEVEL = HIGH |
| 5 | SWO; TRANSMIT BUFFER 361S | BUFFER SIZE = 10, PRIORITY LEVEL = HIGH |
| 6 | SWO; RECEIVE BUFFER 362S | BUFFER SIZE = 500, PRIORITY LEVEL = MID- |

IMPROVING DATA PROCESSING EFFICIENCY BASED ON DATA BEHAVIOR TYPE

CROSS-REFERENCES

This application is based upon and claims the benefit of priority from Japanese patent application No. 2011-009871, filed on Jan. 20, 2011, the disclosure of which is incorporated herein in its entirety by reference.

BACKGROUND

The present invention relates to a command execution device, a command execution system, a command execution method and a command execution program.

Batch processing is normally used in the case of processing large volumes of data in batch, such as calculating the salaries of employees. Patent Publication JP-A-2009-211426 discloses a batch job management system for managing batch jobs for which batch processing is executed.

In batch processing, a series of procedures are registered in advance, and the registered procedures are processed continuously. In the case of batch processing, it is common to execute processing while repeating fixed input/output operations, such as processing after sequentially reading data or sequentially writing processed data. Therefore processing efficiency can be improved by executing processing while considering the characteristics of the input/output operations. In the above mentioned Patent Publication JP-A-2009-211426, nothing is stated about executing processing while considering the input/output operations.

SUMMARY

With the foregoing in view, it is an exemplary object of the present invention to provide a command execution device, a command execution system, a command execution method and a command execution program which can improve processing efficiency.

A command execution device according to an exemplary aspect of the present invention includes: a behavior type decision unit which decides a behavior type indicating the content of data input/output operation, according to the content of data processing executed by an entered command; a command storage unit which refers to setting information set in advance for each of behavior types, and stores the command in a command queue created for each priority level, based on the priority level included in the setting information; and a command execution unit which fetches, out of the commands stored in the command queue, a command stored in a section of the command queue having the highest priority level from the command queue and executes the command.

A command execution system according to an exemplary aspect of the present invention is a command execution system having a client and a server, wherein the client has: a behavior type decision unit which decides a behavior type indicating the content of a data input/output operation, according to the content of data processing executed by an entered command; a first command storage unit which refers to setting information set in advance for each of behavior types, and stores the command in a command queue created for each priority level, based on the priority level included in the setting information; and a command transmit unit which fetches, out of commands stored in the command queue by the first command storage unit, a command stored in a section of the command queue having the highest priority level from the command queue, and transmits the command to the server, and the server has: a command receive unit which receives the command transmitted from the client; a second command storage unit which stores the received command in a section of the command queue created for each of the priority levels, based on the priority level corresponding to the received command; and a command execution unit which fetches, out of commands stored in the command queue by the second command storage unit, a command stored in a section of the command queue having the highest priority level from the command queue, and executes the command.

A command execution method according to an exemplary aspect of the present invention includes: a behavior type decision step of deciding a behavior type indicating the content of data input/output operation, according to the content of the data processing executed by an entered command; a command storage step of referring to setting information set in advance for each of the behavior types and storing the command in a command queue created for each priority level, based on the priority level included in the setting information; and a command execution step of fetching, out of commands stored in the command queue, a command stored in a section of the command queue having the highest priority level from the command queue, and executing the command.

A command execution method according to an exemplary aspect of the present invention is a command execution method for controlling a command execution system having a client and a server, wherein the client includes: a behavior type decision step of deciding a behavior type indicating the content of a data input/output operation, according to the content of data processing executed by an entered command; a first command storage step of referring to setting information set in advance for each of the behavior types and storing the command in a command queue created for each priority level, based on the priority level included in the setting information; and a command transmit step of fetching, out of commands stored in the command queue in the first command storage step, a command stored in a section of the command queue having the highest priority level from the command queue, and transmitting the command to the server, and the server includes: a command receive step of receiving the command transmitted from the client; a second command storage step of storing the received command in a section of the command queue, created for each of the priority levels, based on the priority level corresponding to the received command; and a command execution step of fetching, out of commands stored in the command queues in the second command storage step, a command stored in a section of the command queue having the highest priority level from the command queue, and executing the command.

A command execution program according to an exemplary aspect of the present invention has a computer execute each of the steps included in the above mentioned command execution method.

DESCRIPTION OF THE DRAWINGS

FIG. 2 shows an example of a data configuration of data A (SRO);

FIG. 3 shows an example of a data configuration of data B (SWO);

FIG. 4 shows an example of a data configuration of the setting information according to the first embodiment;

FIG. 5 shows a setting content of a communication module according to the first embodiment;

FIG. 10 shows an example of a data configuration of the setting information according to the second embodiment;

FIG. 11 shows an example of a setting content of a communication module according to the second embodiment;

FIG. 12 shows an example of a setting content of a communication module according to the second embodiment;

EXEMPLARY EMBODIMENT

Embodiments of a command execution device, a command execution system, a command execution method and a command execution program according to the present invention will now be described with reference to the accompanying drawings.

First Embodiment

Figure 1:
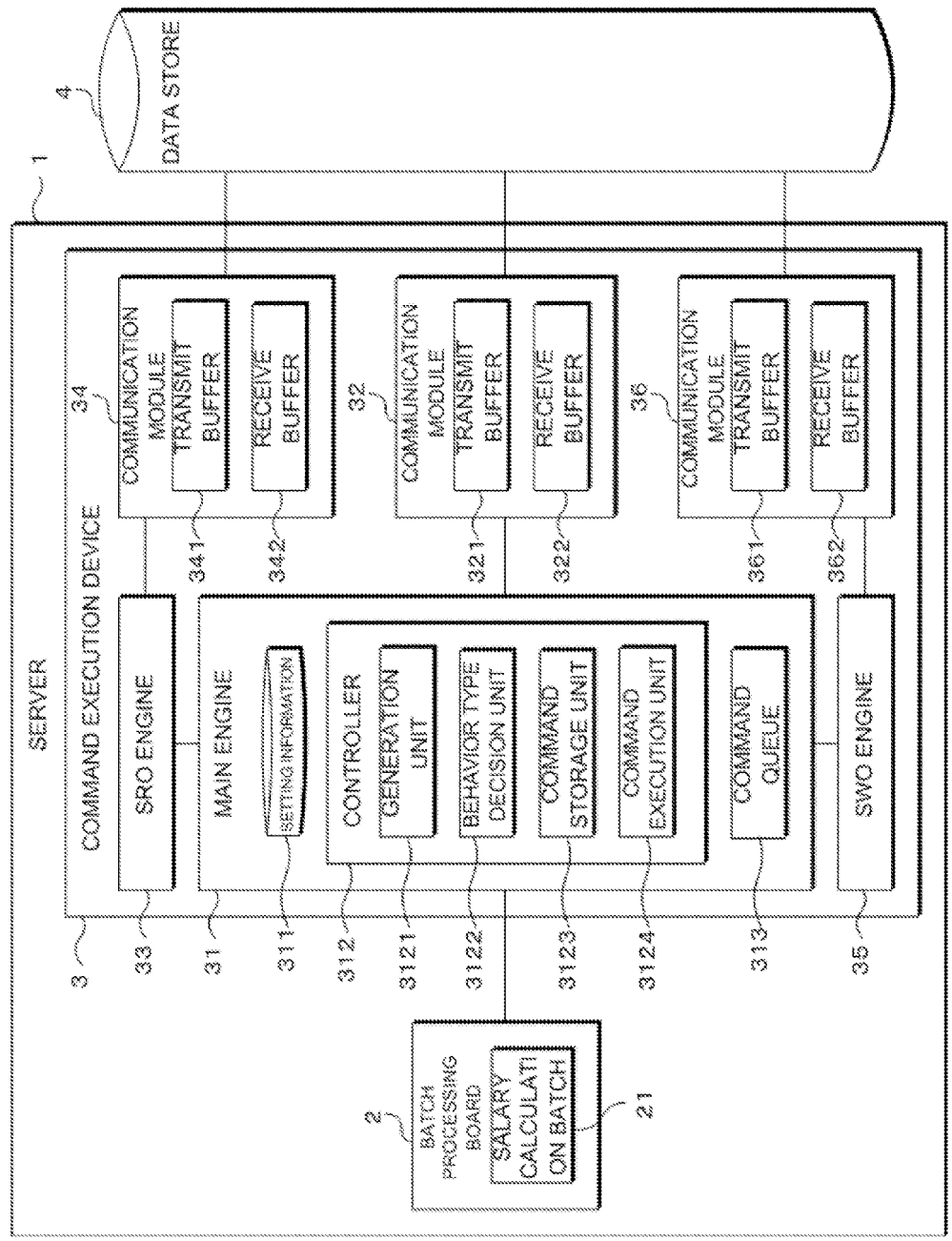
FIG. 1 is a block diagram depicting an example of a configuration of a command execution system according to the first embodiment.

First a configuration of the command execution system according to the first embodiment will be described with reference to FIG. 1. FIG. 1 is a block diagram depicting a configuration of the command execution system according to the first embodiment. The command execution system has a server 1, including a batch processing board 2 and a command execution device 3, and a data store 4. The data store 4 may be constituted by one node or a plurality of nodes. The node may be an HDD (Hard Disk Drive) or a memory, such as a RAM (Random Access Memory). The data store 4 may be installed in the server 1.

The batch processing board 2 executes various batch processings. In the present embodiment, a case of executing a salary calculation batch 21, out of various batch processings, will be described. The salary calculation batch 21 reads/writes data stored in the data store 4 via the command execution device 3. The processing procedure of the salary calculation batch 21 will be described using an example with reference to FIG. 2 and FIG. 3.

First the salary calculation batch 21 reads data A of which employee number is "1", among the data A shown in FIG. 2, from the data store 4. Then the salary calculation batch 21 calculates an interim insurance premium based on the salary indicated in data A to generate data B of which employee number is "1" shown in FIG. 3, and stores data B in the data store 4. Then the salary calculation batch 21 reads data A of which employee number is "2" from the data store 4, generates data B of which employee number is "2" in the same manner as above, and stores data B in the data store 4. This processing is repeated for all the employees.

In the present invention, the concept "behavior type" is attached to the data. The behavior type is represented by attribute information (meta data), which indicates the content of a data input/output operation. For example, data A is sequential read only (hereafter "SRO") data, and "SRO" is attached to data A as the behavior type. Data B is sequential write only (hereafter "SWO") data, and "SWO" is attached to data B as the behavior type in advance. In the case of batch processing, the behavior type can be attached to the data in advance, since the data input/output operations are fixed.

By attaching a behavior type to data in advance, the processing according to the behavior type can be executed, hence processing efficiency can be improved. For example, data A is sequential read only data, so processing speed increases by reading data A ahead in advance as much as possible.

The salary calculation batch 21 shown in FIG. 1 updates the setting information stored in a setting information storage unit 311 of the command execution device 3, according to the content of the batch processing. The data configuration of the setting information will be described with reference to FIG. 4.

The setting information shown in FIG. 4 has various setting contents for each of the behavior types. In a behavior type, the above mentioned SRO and SWO are stored. The various setting contents have such data items as behavior, command, response, communication module, communication method, number of read-ahead data and number of copies.

In "behavior", a content of a data input/output operation is stored. For example, if the behaviour type is "SRO", "sequential read-ahead" is stored, and if the behavior type is "SWO", "sequential write-through" is stored. A "number of read-ahead data" is an item which is set when the behavior type is "SRO", and an upper limit value of the number of read-ahead data is stored when the sequential read-ahead processing is performed.

In command, a size of data required upon executing a command issued by the batch processing, and a priority level of processing to be executed by this example are stored. For example, if the behavior type is "SRO", "10", which is the size of data including a command to read, is stored in data size, and "high" is stored in priority level. If the behavior type is "SWO", "500", which is the size of data including write data B, is stored in data size, and "mid-" is stored in priority level. According to the present embodiment, priorities are described in terms of "highest", "high", "mid-", "low" and "lowest" in descending order.

In response, a size of data of the command execution result and a priority level of processing to reply to this data to the batch processing side are stored. For example, if the behavior type is "SRO", "100", which is the size of data including data A read from the data store 4, is stored in data size, and "low" is stored in priority level. If the behaviour type is "SWO", "10", which is the size of data including a response content to writing to the data store 4, is stored in data size, and "high" is stored in priority level.

In communication module, information for identifying the communication module is stored. For example, if the behavior type is "SRO", "communication module 34" is stored in communication module, and if the behavior type is "SWO", "communication module 36" is stored in communication module. In communication method, a means for implementing interprocess communication, such as "socket", is stored, for example.

The command execution device 3 in FIG. 1 has a main engine 31, a communication module 32, an SRO engine 33, a communication module 34, an SWO engine 35 and a communication module 36. The SRO engine 33 and the SWO engine 35 are collectively referred to as a "behavior engine". The behavior engine performs data handling, which is most appropriate for the behavior type being set. The data handling includes, for example, a data read procedure, a data retrieval method and a write reliability assurance.

The SRO engine 33, the communication module 34, the SWO engine 35 and the communication module 36 shown in FIG. 1 can be generated, changed or deleted by registering or updating the setting information.

The main engine 31 has a setting information storage unit 311 for storing the setting information, a controller 312 for controlling the command execution device 3, and a command queue 313 for storing a command executed by the controller 312.

The controller 312 has a generation unit 3121, a behavior type decision unit 3122, a command storage unit 3123 and a command execution unit 3124.

When the setting information is registered or updated, the generation unit 3121 generates a component group, including the behavior engine and the communication module, for each of the behavior types based on the setting information after registration or update. For example, if the behavior type in the setting information after registration is "SRO", the generation unit 3121 generates the SRO engine 33 and the communication module 34 having a transmit buffer 341 and a receive buffer 342. If the behavior type in the setting information after registration is "SWO", the generation unit 3121 generates the SWO engine 35 and the communication module 36 having a transmit buffer 361 and a receive buffer 362.

For example, if the setting information is registered with the content shown in FIG. 4, the generation unit 3121 generates a communication module with the content shown in FIG. 5. In concrete terms, the generation unit 3121 sequentially assigns "buffer 1" to "buffer 4" to the transmit buffer 341 and the receive buffer 342 in the SRO engine 33, and the transmit buffer 361 and the receive buffer 362 in the SWO engine 35.

Since the data size of the command is "10", and the priority level is "high" in the SRO shown in FIG. 4, the generation unit 3121 sets the buffer size of the transmit buffer 341 to "10" and the priority level to "high". Since the data size of the response is "100", the priority level is "low" and the number of read-ahead data is "10" in the SRO shown in FIG. 4, the generation unit 3121 sets the buffer size of the receive buffer 342 to "1000", and the priority level to "low". This means that in SRO, commands are stored in the transmit buffer and are sent one at a time, but a maximum of ten responses can be stored in the receive buffer.

Therefore a command responding to reading data A is stored in the transmit buffer 341 which is "buffer 1", and is processed as a command of which priority level is "high". A response corresponding to reading data A is stored in the receive buffer 342 which is "buffer 2", and is processed as a command of which priority level is "low".

Since the data size of the command is "500" and the priority level is "mid-" in the SWO shown in FIG. 4, the generation unit 3121 sets the buffer size of the transmit buffer 361 to "500" and the priority level to "mid-". Since the data size of the response is "10" and the priority level is "high" in the SWO shown in FIG. 4, the generation unit 3121 sets the buffer size of the receive buffer 362 to "10" and the priority level to "high".

Therefore a command corresponding to writing data B is stored in the transmit buffer 361 which is "buffer 3", and is processed as a command of which priority level is "mid-". A response corresponding to writing data B is stored in the receive buffer 362 which is "buffer 4", and is processed as a command of which priority level is "high".

The behavior type decision unit 3122 shown in FIG. 1 decides a behavior type to indicate a content of the data input/output operation according to the content of the data processing to be executed by an entered command. According to the present embodiment, the behavior type identification information, to identify the content of the data processing to be executed by the command, is attached to the data in advance. Therefore the behavior type decision unit 3122 can decide a behavior type based on the behavior type identification information included in the data used for data processing.

The command storage unit 3123 refers to the setting information which is set in advance for each of the behavior types, and stores the command in a section of command queue 313, which is created for each priority level, based on the priority level included in the setting information.

Out of the commands stored in the command queue 313, the command execution unit 3124 fetches a command stored in a section of the command queue having the highest priority from the command queue 313, and executes the command.

The communication modules 32, 24 and 36 include the transmit buffers 321, 341 and 361 and the receive buffers 322, 342 and 362 respectively. In the communication modules 32, 34 and 36, each buffer size of the transmit buffers 321, 341 and 361 and the receive buffers 322, 342 and 362, the priority level of data transmission/reception, and the communication method and the like are controlled by the main engine 31, the SRO engine 33 and the SWO engine 35 respectively, and the data transmit/receive timing is controlled.

The command queue 313 stores commands for reading/writing data specified by the salary calculation batch 21 of the batch processing board 2 and the command attribute information. The command attribute information is, for example, a command type, and the identification information of a buffer which stores the command. The command type is, for example, "command" or "response", and the identification information of a buffer is, for example, "buffer 1" or "buffer 2".

The command queue 313 is sectioned for each priority, and stores a command to be executed with the same priority level as the priority level assigned to the section. The command stored in the command queue 313 is executed by the command execution unit 3124, and is deleted from the command queue 313.

The command queue 313 interlocks with the transmit/receive state of the communication modules 32, 34 and 36, and controls the addition or deletion of the commands according to the transmit/receive state of the communication modules 32, 34 and 36.

As FIG. 4 shows, the priority in SRO or SWO is set separately for the command and for the response. As a result, a command corresponding to the reading of data A is stored in a section of the command queue 313 where the priority level is set to "high", and a response corresponding to the reading of data A is stored in a section of the command queue 313 where the priority level is set to "low". A command corresponding to the writing of data B is stored in a section of the command queue 313 where the priority level is set to "mid-", and a response corresponding to the writing of data B is stored in a section of the command queue 313 where the priority level is set to "high".

Figure 6:
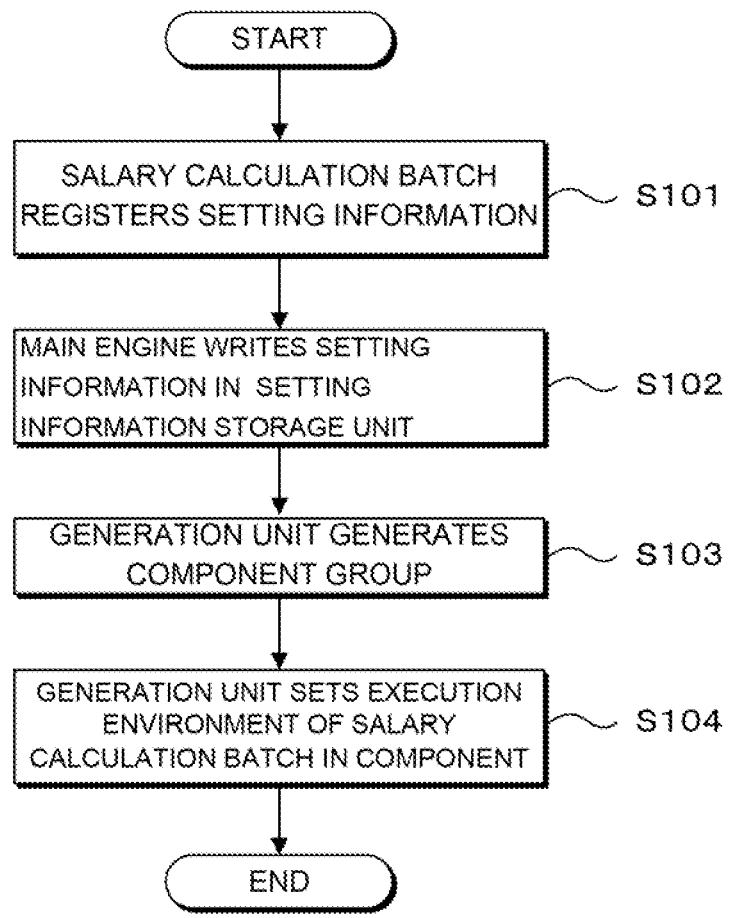
FIG. 6 is a flow chart depicting an operation in a preparation stage before executing the salary calculation batch according to the first embodiment.

Now operation of the command execution system according to the first embodiment will be described. First operation in the preparation stage, before executing the salary calculation batch, will be described with reference to FIG. 6. In this operation example, a case of the salary calculation batch 21 executing batch processing using data A (SRO) shown in FIG. 2 and data B (SWO) shown in FIG. 3 will be described.

In the beginning, the salary calculation batch 21 of the batch processing board 2 registers the setting information, including the behavior of the data to be used in the batch processing and the priority level, in the command execution device 3, based on the batch processing to be executed (step S101).

Then the main engine 31 of the command execution device 3 writes the setting information, which is registered by the salary calculation batch 21, in the setting information storage unit 311 (step S102). In this operation example, the setting information of which behavior type is "SRO" and the setting information of which behavior type is "SWO" shown in FIG. 4 are written in the setting information storage unit 311 respectively.

Then based on the setting information written in the setting information storage unit 311, the generation unit 3121 of the main engine 31 generates a component group including the SRO engine 33, the communication module 34, the SWO engine 35 and the communication module 36 (step S103).

Then based on the setting information written in the setting information storage unit 311, the generation unit 3121 of the main engine 31 sets the execution environment of the salary calculation batch 21 in each component (step S103). In this operation example, the execution environment is set so that the SRO engine 33 uses the communication module 34, and the SWO engine 35 uses the communication module 36. The buffer sizes of the transmit buffers 341 and 361 and the receiver buffers 342 and 362, the priority level of the processing in the command execution device 3, and the initial state of the command queue 313 (initial state is empty), for example, are set as the execution environment.

Figure 7:
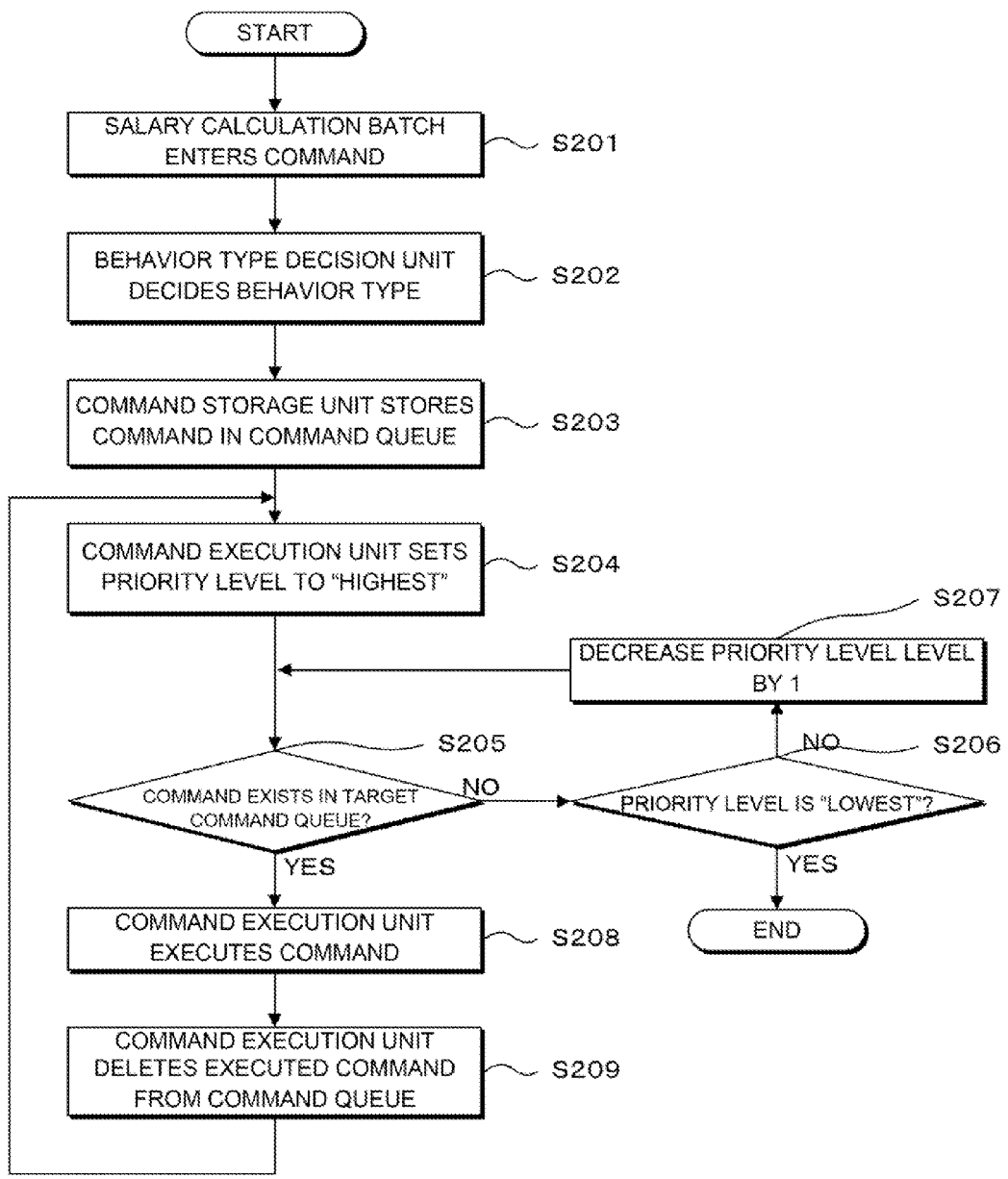
FIG. 7 is a flow chart depicting an operation upon executing the salary calculation batch according to the first embodiment.

Now operation upon executing the salary calculation batch will be described with reference to FIG. 7. This operation is executed repeatedly every time a command is entered from the salary calculation batch.

First a command is entered from the salary calculation batch 21 of the batch processing board 2 to the command execution device 3 (step S201).

Then the behavior type decision unit 3122 of the command execution device 3 analyzes the content of the command, and decides a behavior type of the command (step S202). In this operation example, the behavior type is decided by referring to the behavior type identification information of the data used for the data processing, which is executed by the command.

Then the command storage unit 3123 of the command execution device 3 stores the command in the command queue 313 based on the setting information corresponding to the behavior type, which is decided in step S202 (step S203).

Then the command execution unit 3124 of the command execution device 3 starts operation, and sets the priority level to "highest" (step S204).

Then the command execution unit 3124 determines whether a command is stored in a section of the command queue 313 corresponding to the priority level being set (step S205). If the result is NO (step S205: NO), the command execution unit 3124 decreases the priority level by 1 (step S207), moves the processing to step S205 if the priority level is not "lowest" (step S206: NO), or ends this operation if the priority level is "lowest" (step S206: YES).

If the result of step S205 is that a command is stored in the section of the command queue 313 corresponding to the priority level being set (step S205: YES), the command execution unit 3124 executes the command (step S208), deletes the executed command from the command queue 313 (step S209), and moves the processing to step S204.

As a concrete example of the above mentioned operation in FIG. 7, a case of the salary calculation batch 21 executing the batch processing using data A (SRO) shown in FIG. 2 and data B (SWO) shown in FIG. 3 will be described.

First the salary calculation batch 21 of the batch processing board 2 enters a command to read data A of which employee number is "1", out of data A shown in FIG. 2 (step S201).

Then the behavior type decision unit 3122 of the command execution device 3 decides on the "SRO" as a behavior type of the command to read data A (step S202).

Then the command storage unit 3123 of the command execution device 3 stores the command to read data A in a section of the command queue 313 where the priority level is set to "high", based on the setting information corresponding to the behavior type "SRO" (step S203).

Then the command execution unit 3124 of the command execution device 3 sets the priority level to the initial value "highest" (step S204).

Then the command execution unit 3124 determines whether a command is stored in a section of the command queue 313 where the priority level is set to "highest" (step S205), and since the result is NO (step S205: NO), the command execution unit 3124 decreases the priority level to "high" (step S207).

Then the command execution unit 3124 determines whether a command is stored in a section of the command queue 313 where the priority level is set to "high" (step S205), and since the result is YES (step S205: YES), the command execution unit 3124 transfers this command to the SRO engine 33. Thereby this command is executed (step S208), and the command execution unit 3124 deletes this command from the command queue 313 (step S209).

The SRO engine 33, which received the command from the command execution unit 3124, reads data A of which employee number is "1" from the data store 4, and stores data A in the receive buffer 342. Data A stored in the receive buffer 342 is transmitted to the salary calculation batch 21 as a response to the command entered in step S201.

Since "10" is set as a number of read-ahead data in the setting information corresponding to the behavior type "SRO", the SRO engine 33 reads ten cases of data A having employee numbers "1" to "10", and sequentially stores the data in the receive buffer 342.

If a command to read data A of which employee numbers are "2" to "10" is entered from the salary calculation batch 21 thereafter, data which is read-ahead and stored in the receive buffer 342, is replied to the salary calculation batch 21. As a result, processing speed can be increased. As FIG. 5 shows, the buffer size of the receive buffer 342 is set to "1000", where "10" cases of data A, each of which has the data size "100", can be stored.

Then the salary calculation batch 21 of the batch processing board 2 enters a command to write data B of which employee number is "1" out of data B shown in FIG. 3 (step S201). Data B is data which includes the result after the salary calculation batch 21 performed calculation using data A.

Then the behavior type decision unit 3122 of the command execution device 3 decides "SWO" as a behavior type of the command to write data B (step S202).

Then the command storage unit 3123 of the command execution device 3 stores the command to write data B in a section of the command queue 313 where priority is set to "mid-", based on the setting information corresponding to the behavior type "SWO" (step S203).

Then the command execution unit 3124 of the command execution device 3 starts operation, and sets the priority level to "highest" (step S204).

Then the command execution unit 3124 determines whether a command is stored in a section of the command queue 313 where the priority level is set to "highest" (step S205), and since the result is NO (step S205: NO), the command execution unit 3124 decreases the priority level to "high" (step S207).

Then the command execution unit 3124 determines whether a command is stored in a section of the command queue 313 where the priority level is set to "high" (step S205), and since the result is NO (step S205: NO), the command execution unit 3124 decreases the priority level to "mid-" (step S207).

Then the command execution unit 3124 determines whether a command is stored in a section of the command queue 313 where the priority is set to "mid-" (step S205), and since the result is YES (step S205:YES), the command execution unit 3124 transfers this command to the SWO engine 35. Thereby this command is executed (step S208), and the command execution unit 3124 deletes this command from the command queue 313 (step S209).

The SWO engine 35, which received the command from the command execution unit 3124, writes data B of which employee number is "1", stored in the transmission buffer 361, in the data store 4, and stores the content of the response to this writing in the receive buffer 362.

Now an operation in the case of the processing of data B, overlapping with the processing of data A, will be described.

First the salary calculation batch 21 enters a command to write data B to the command execution device 3. Then the command execution unit 3124 transfers the command to the SWO engine 35, since the behavior type of data B is "SWO".

Here the receive buffer 342 of SRO for storing data A is "buffer 2", and the transmit buffer 361 of SWO for transmitting data B is "buffer 3". Comparing the priority level "low" of the "buffer 2" and the priority level "mid-" of the "buffer 3", the "buffer 3" has a higher priority. Therefore the command execution unit 3124 interrupts the read-ahead processing if the SRO engine 33 is executing the read-ahead processing of data A, and writes data B with priority. After writing data B ends, the command execution unit 3124 restarts the read-ahead processing of data A.

If data B is written successfully, the data store 4 replies with the write response of data B to the command execution device 3. Then the communication module 36 stores the write response of data B in the receive buffer 362. Then the communication module 36 notifies the main engine 31, via the SWO engine 35, that the command is stored in the receive buffer 362.

If the SRO engine 33 is executing a read-ahead processing of data A, the command execution unit 3124 interrupts the read-ahead processing, since the receive buffer 362 of SWO is "buffer 4" of which priority level is "high", and replies with the write response of data B to the salary calculation batch 21 with priority. After the reply of the write response of data B ends, the command execution unit 3124 restarts the read-ahead processing of data A. Since the salary calculation batch 21 recognizes that data B was written successfully, time to advance to the next processing can be decreased.

As described above, according to the command execution system of the first embodiment, a behavior type is defined for each data input/output operation, and the setting information including a priority level is registered for each behavior type, therefore data processing according to the behavior type can be executed with a priority level appropriate for the behavior type, which can be decided based on the entered command. Therefore data processing unique to the batch processing can be efficiently executed.

The behavior type can be defined and the setting information can be registered before executing batch processing, hence even if the content of the batch processing is changed, such as changing the data size that is handled in the batch processing, changes can be easily handled.

Some of the communication modules have dedicated memories as separate hardware (e.g. NIC (Network Interface Card) with TCP/IP Engine), so the memory of a communication module may be used as a buffer, instead of using the main memory. By using the buffer of the communication module as the buffer of the behavior engine, main memory space can be freed.

If a communication module is provided for each behavior engine, the priority can be controlled according to the behavior type, without fetching data from the buffer of the communication module. For example, if only one socket is used to access the data store 4, the content of a command/response and data cannot be recognized unless the data is fetched from the socket, so priority level control according to the behavior type cannot be implemented without fetching data from the buffer.

Second Embodiment

Figure 8:
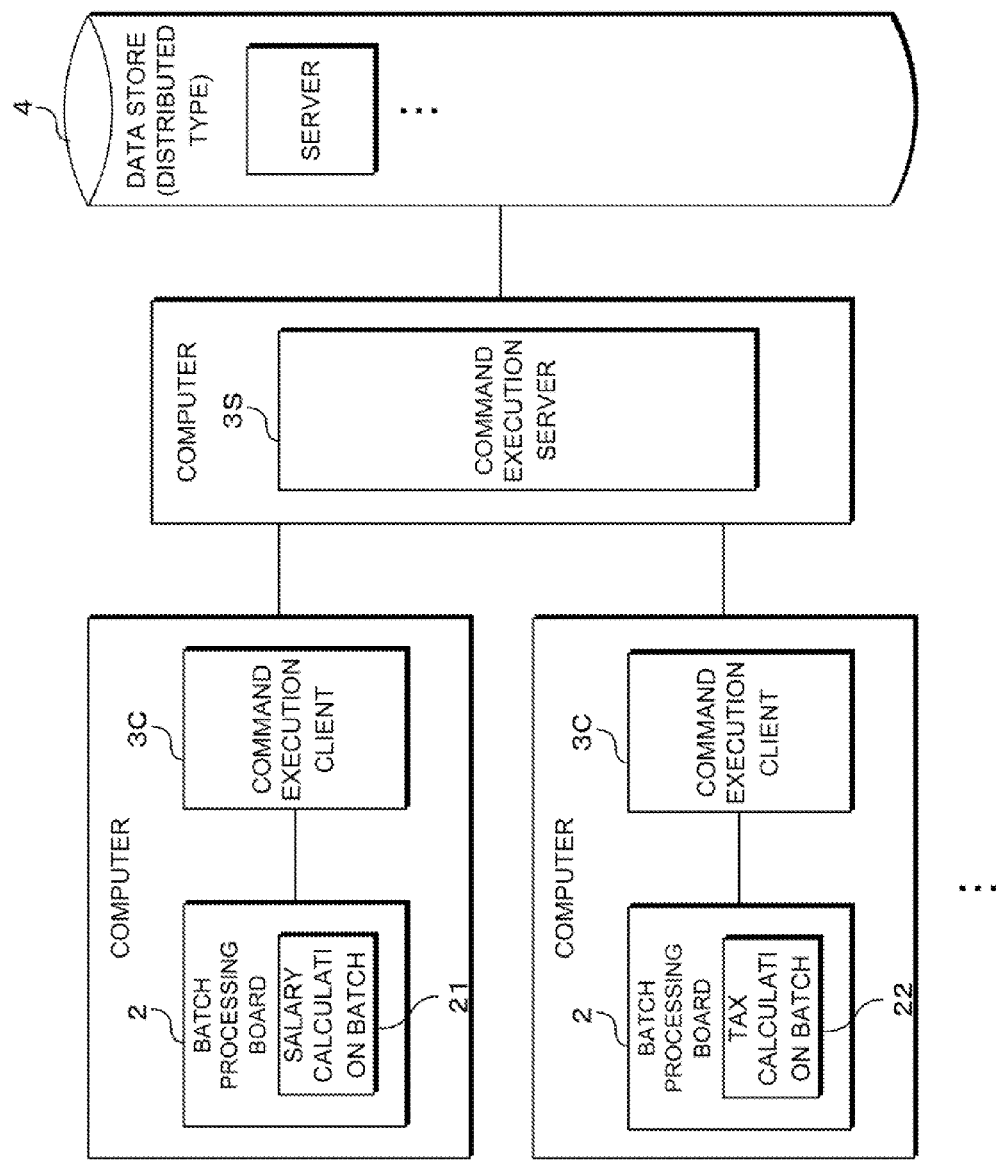
FIG. 8 is a block diagram depicting an example of a configuration of a command execution system according to the second embodiment.

The second embodiment will now be described. A command execution system according to the second embodiment executes batch processing under a distributed environment where the execution environment of the batch processing the data store are distributed to a plurality of servers. FIG. 8 is a block diagram depicting a configuration of the command execution system according to the second embodiment. Hereafter the main differences from the first embodiment will be described.

As FIG. 8 shows, the differences of the command execution system according to the second embodiment from the command execution system according to the first embodiment is that the command execution device 3 in the first embodiment is separated into the command execution client 3C and the command execution server 3S, the batch processing board 2 in the first embodiment is distributed for batch processing 21 and batch processing 22, a command execution client 3C is provided to each distributed batch processing, and the data store 4 is constituted by a plurality of servers to distribute and manage the data. A number of command execution clients 3C and a number of command execution servers 3S may be one or two or more. The command execution server 3S may be distributed, so that the behavior types and setting information are shared and synchronized by each of the command execution servers 3S.

Figure 9:
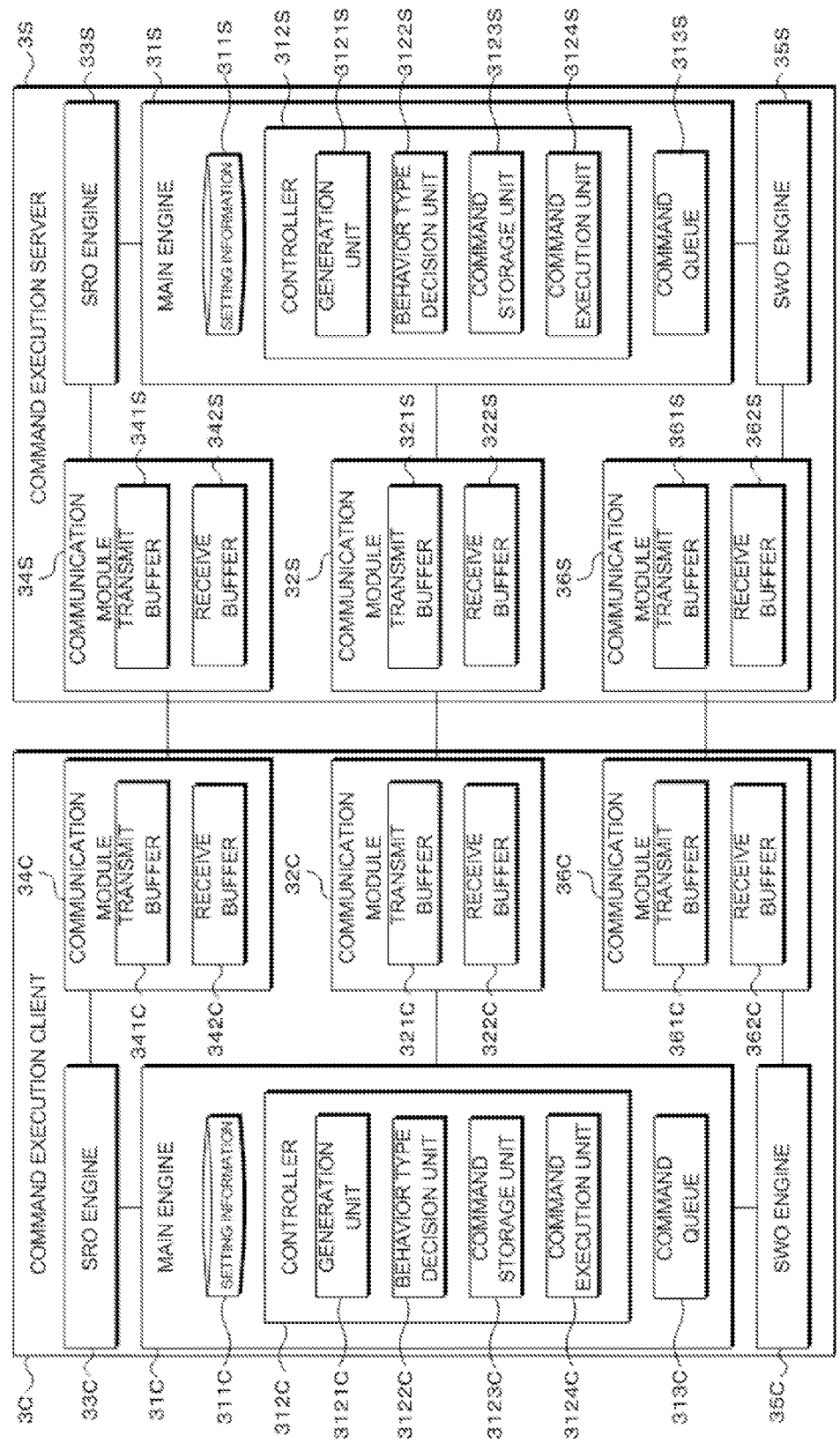
FIG. 9 is a block diagram depicting an example of a configuration of a command execution client and a command execution server according to the second embodiment.

As FIG. 9 shows, the command execution client 3C and the command execution server 3S have similar composing elements of the command execution device 3 in the first embodiment shown in FIG. 1 respectively. However of the functions of the composing elements of the command execution client 3C and the command execution server 3S are partially different from those of the composing elements of the command execution device 3 in the first embodiment. This is because while the command execution device 3 relays data in the batch processing board 2 and the data store 4 in the first embodiment, the command execution client 3C and the command execution server 3S relay data between the batch processing board 2 and the data store 4 in the second embodiment.

Out of a plurality of command execution clients 3C, the command execution client 3C connected to the batch processing board 2 having the salary calculation batch 21 will now be described as an example.

The salary calculation batch 21 registers and updates the setting information according to the content of the batch processing. If the setting information is registered or updated, the registration or update is reflected in the setting information stored in the setting information storage unit 311C of the command execution client 3C, and in the setting information stored in the setting information storage unit 311S of the command execution server 3S via synchronization. The setting information can be synchronized or the setting information can be exchanged between the command execution client 3C and the command execution server 3S when necessary.

The setting information according to the second embodiment will now be described with reference to FIG. 10. The setting information according to the second embodiment has the same data items as the setting information according to the first embodiment shown in FIG. 4. In the setting information according to the second embodiment, "control" is registered as a behavior type. This behavior type can be used as a behavior type for control when the setting information is synchronized between the command execution client 3C and the command execution server 3S. "SRO" and "SWO" of the behavior type are the same as the setting information according to the first embodiment. The command execution server 3S can be connected with a plurality of command execution clients 3C, and has independent setting information for each of the connected command execution clients 3C.

The command execution client 3C and the command execution server 3S generate the behavior engine and the communication module respectively based on the setting information. In concrete terms, the generation unit 3121C of the command execution client 3C generates the SRO engine 33C, the SWO engine 35C and the communication modules 34C and 36C, and sets the transmit buffer and the receive buffer based on the setting information shown in FIG. 10. The generation unit 3121S of the command execution server 3S as well generates the SRO engine 33S, the SWO engine 35S and the communication modules 34S and 36S, and sets the transmit buffer and the receive buffer.

To generate the communication module based on the setting information shown in FIG. 10, the generation units 3121C and 3121S generate the communication modules respectively using the contents shown in FIG. 11 and FIG. 12. FIG. 11 shows a setting content of the communication module of the command execution client 3C, and FIG. 12 shows a setting content of the communication module of the command execution server 3S.

As FIG. 12 shows, the generation unit 3121S of the command execution server 3S exchanges the setting content of the receive buffer and the setting content of the transmit buffer in the settings of SRO and SWO. This is because the data transmitted from the transmit buffer of the command execution client 3C is stored in the receive buffer of the command execution server 3S, and the data transmitted from the transmission buffer of the command execution client 3S is stored in the receive buffer of the command execution client 3C, hence the data size and the priority level must be matched between the buffers which exchange the same data.

Figure 13:
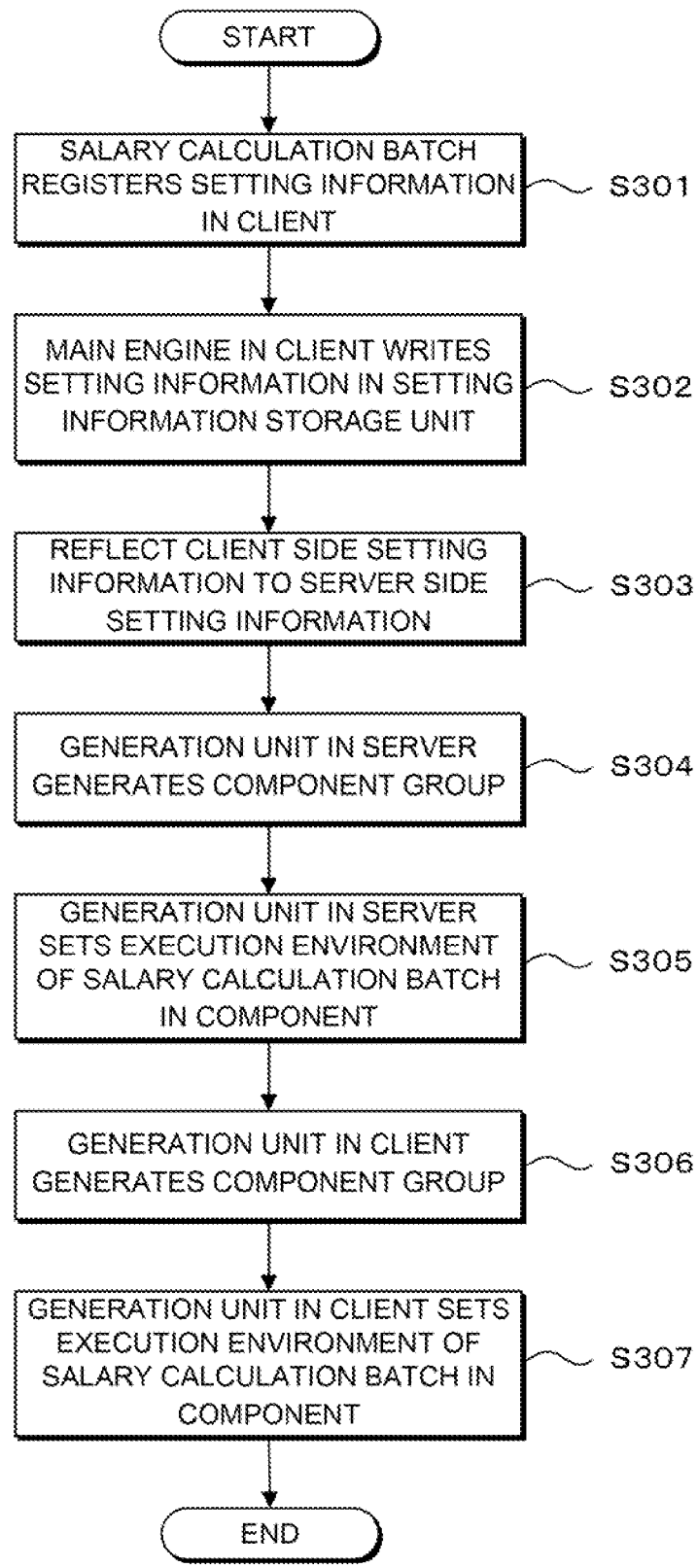
FIG. 13 is a flow chart depicting an operation in a preparation stage before executing the salary calculation batch according to the second embodiment.

Now operation of the command execution system according to the second embodiment will be described. First operation in the preparation stage, before executing the salary calculation batch, will be described with reference to FIG. 13. In this operation example, a case of the salary calculation batch 21 executing batch processing using data A (SRO) shown in FIG. 2 and data B (SWO) shown in FIG. 3 will be described.

In the beginning, the salary calculation batch 21 of the batch processing board 2 registers the setting information, including the behavior of the data to be used in the batch processing and the priority level, in the command execution client 3C, based on the batch processing to be executed (step S301).

Then the main engine 31C of the command execution client 3C writes the setting information, which is registered by the salary calculation batch 21, to the setting information storage unit 311C (step S302). In this operation example, the setting information of which behavior type is "SRO", and the setting information of which behavior type is "SWO" shown in FIG. 10, are written in the setting information storage unit 311C respectively.

Then the command execution client 3C reflects the setting information after writing the setting information of the command execution server 3S (step S303). In concrete terms, based on the setting information of which behavior type being set is "control", the command execution client 3C connects the communication module 32S of the command execution server 3S, and reflects the setting information after writing the setting information in the command execution server 3S for synchronization.

Then based on the setting information being set in the setting information storage unit 311S, the generation unit 3121S of the command execution server 3S generates a component group including the SRO engine 33S, the communication module 34S, the SWO engine 35S and the communication module 36S (step S304).

Then based on the setting information being set in the setting information storage unit 311S, the generation unit 3121S of the command execution server 3S sets the execution environment of the salary calculation batch 21 in each component (step S305). In this operation example, the execution environment is set so that the SRO engine 33S uses the communication module 34S, and the SWO engine 35S uses the communication module 36S. The buffer sizes of the transmit buffers 341S and 361S and the receive buffers 342S and 362S, the priority level of the processing in the command execution server 3S, and the initial state of the command queue 313S (initial state is empty), for example, are set as the execution environment.

Then based on the setting information being set in the setting information storage unit 311C, the generation unit 3121C of the command execution client 3C generates a component group including the SRO engine 33C, the communication module 34C, the SWO engine 35C and the communication module 36C (step S306).

Then based on the setting information being set in the setting information storage unit 311C, the generation unit 3121C of the command execution client 3C sets the execution environment of the salary calculation batch 21 in each component (step S307). In this operation example, the execution environment is set so that the SRO engine 33C uses the communication module 34C, and the SWO engine 35C uses the communication module 36C. The buffer sizes of the transmit buffers 341C and 361C and the receive buffers 342C and 362C, the priority level of the processing in the command execution client 3C, and the initial state of the command queue 313C (initial state is empty), for example, are set as the execution environment.

Figure 14:
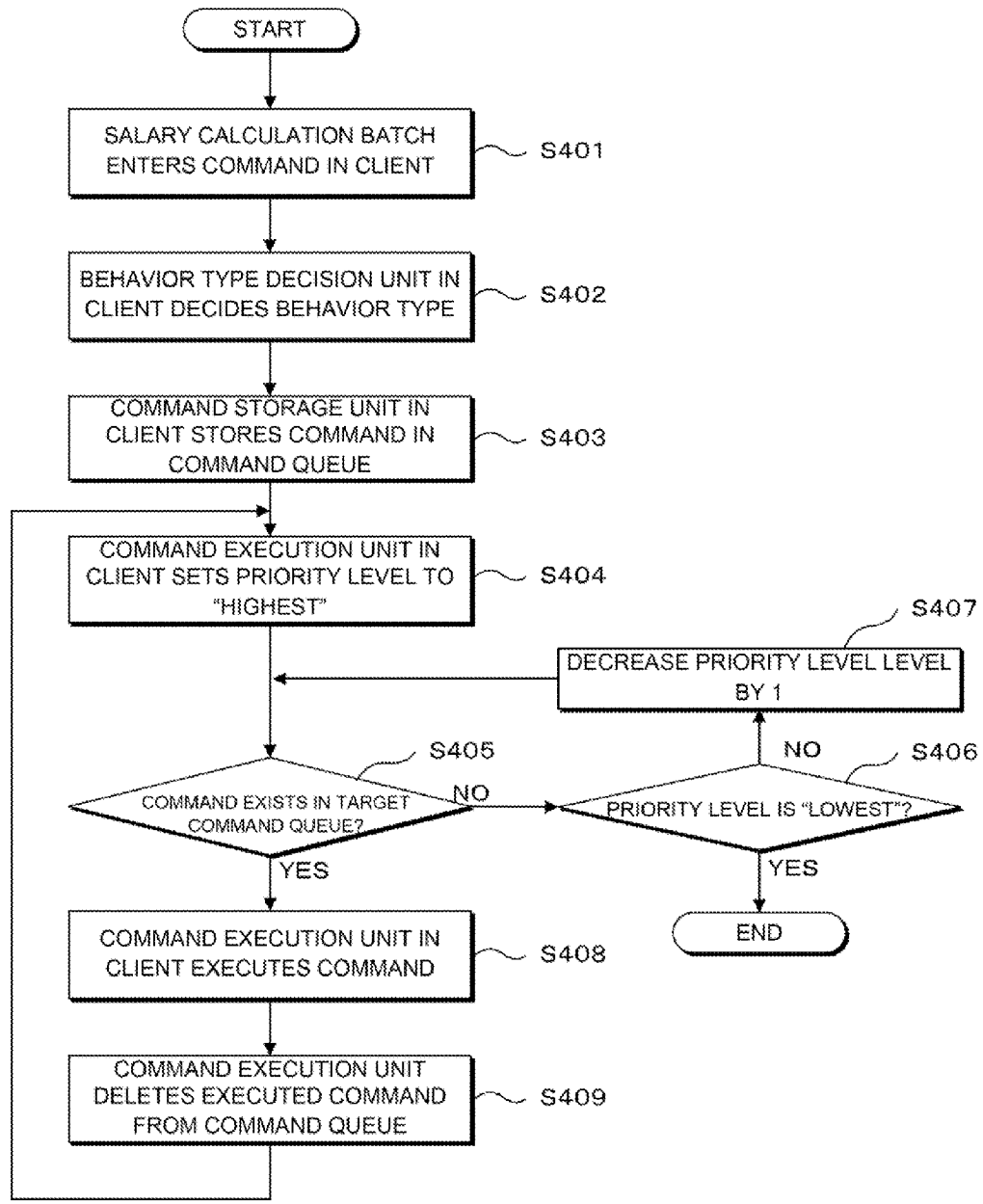
FIG. 14 is a flow chart depicting an operation in the command execution client upon executing the salary calculation batch according to the second embodiment.

Now operation in the command execution client upon executing the salary calculation batch will be described with reference to FIG. 14. This operation is executed repeatedly every time a command is entered from the salary calculation batch.

First a command is entered from the salary calculation batch 21 of the batch processing board 2 to the command execution client 3C (step S401).

Then the behavior type decision unit 3122C of the command execution client 3C analyzes the content of the command, and decides a behavior type of the command (step S402). In this operation example, the behavior type is decided by referring to the behavior type identification information of the data used for the data processing, which is executed by the command.

Then the command storage unit 3123C of the command execution client 3C stores the command in the command queue 313C based on the setting information corresponding to the behavior type, which is decided in step S402 (step S403).

Then the command execution unit 3124C of the command execution client 3C starts operation, and sets the priority level to "highest" (step S404).

Then the command execution unit 3124C determines whether a command is stored in a section of the command queue 313C corresponding to the priority level being set (step S405). If the result is NO (step S405: NO), the command execution unit 3124C decreases the priority level by 1 (step S407), moves the processing to step S405 if the priority level is not "lowest" (step S406: NO), or ends this operation if the priority level is "lowest" (step S406: YES).

If the result of step S405 is that a command is stored in a section of the command queue 313C corresponding to the priority level being set (step S405: YES), the command execution unit 3124C executes the command (step S408), deletes the executed command from the command queue 313C (step S409), and moves the processing to step S404.

Figure 15:
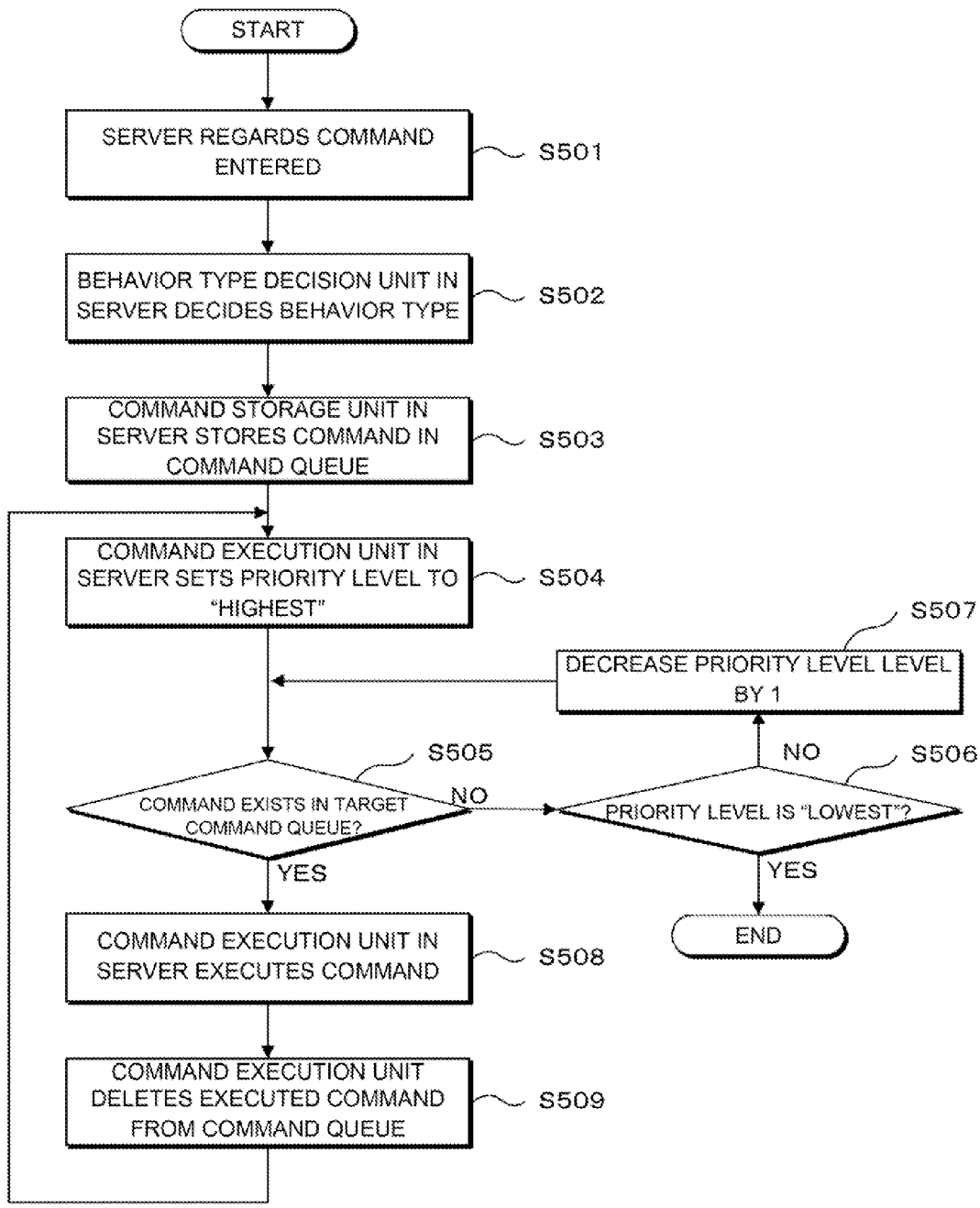
FIG. 15 is a flow chart depicting an operation in the command execution server upon executing the salary calculation batch according to the second embodiment.

Now with reference to FIG. 15, operation in the command execution server upon executing the salary calculation batch will be described. This operation is executed repeatedly every time it is regarded that a command is entered from the salary calculation batch.

First it is regarded that a command is entered when a command is stored in the receive buffer 342S of the communication module 34S (step S501).

Then the behavior type decision unit 3122S of the command execution server 3S decides a behavior type of the command based on the receive buffer 342S in which the command is stored (step S502).

Then the command storage unit 3123S of the command execution server 3S stores the command in the command queue 313S based on the setting information corresponding to the behavior type, which is decided in step S502 (step S503).

Then the command execution unit 3124S of the command execution server 3S starts operation, and sets the priority level to "highest" (step S504).

Then the command execution unit 3124S determines whether a command is stored in a section of the command queue 313S corresponding to the priority level being set (step S505). If the result is NO (step S505: NO), the command execution unit 3124S decreases the priority level by 1 (step S507), moves the processing to step S505 if the priority level is not "lowest" (step S506: NO), or ends this operation if the priority level is "lowest" (step S506: YES).

If the result of step S505 is that a command is stored in a section of the command queue 313S corresponding to the priority level being set (step S505: YES), the command execution unit 3124S executes the command (step S508), deletes the executed command from the command queue 313S (step S509), and moves the processing to step S504.

As a concrete example of the above mentioned operations in FIG. 14 and FIG. 15, a case of the salary calculation batch 21 executing the batch processing using data A (SRO) shown in FIG. 2 and data B (SWO) shown in FIG. 3 will be described.

First the salary calculation batch 21 of the batch processing board 2 enters a command to the command execution client 3C to read data A of which employee number is "1", out of data A shown in FIG. 2 (step S401).

Then the behavior type decision unit 3122C of the command execution client 3C decides on "SRO" as a behavior type of the command to read data A (step S402).

Then the command storage unit 3123C of the command execution client 3C stores the command to read data A to a section of the command queue 313C where the priority level is set to "high", based on the setting information corresponding to the behavior type "SRO" (step S403).

Then the command execution unit 3124C of the command execution client 3C sets the priority level to the initial value "highest" (step S404).

Then the command execution unit 3124C determines whether a command is stored in a section of the command queue 313C where the priority level is set to "highest" (step S405), and since the result is NO (step S405: NO), the command execution unit 3124C decreases the priority level to "high" (step S407).

Then the command execution unit 3124C determines whether a command is stored in a section of the command queue 313C where the priority level is set to "high" (step S405), and since the result is YES (step S405: YES), the command execution unit 3124C transfers this command to the SRO engine 33C. Thereby this command is executed (step S408), and the command execution unit 3124C deletes this command from the command queue 313C (step S409).

The SRO engine 33C, which received the command from the command execution unit 3124C, stores this command in the transmit buffer 341C. The command stored in the transmit buffer 341C is transmitted to the command execution server 3S.

Then the behavior type decision unit 3122S of the command execution server 3S decides "SRO" as a behavior type of the command to read data A, since the receive buffer 342S, which stores the command transmitted from the command execution client 3C, is "buffer 4" (step S502).

Then the command storage unit 3123S of the command execution server 3S stores the command to read data A to a section of the command queue 313S where the priority level is set to "high", based on the setting information corresponding to the behavior type "SRO" (step S503).

Then the command execution unit 3124S of the command execution server 3S sets the priority level to the initial value "highest" (step S504).

Then the command execution unit 3124S determines whether a command is stored in a section of the command queue 313S where the priority level is set to "highest" (step S505), and since the result is NO (step S505: NO), the command execution unit 3124S decreases the priority level to "high" (step S507).

Then the command execution unit 3124S determines whether a command is stored in a section of the command queue 313S where the priority is set to "high" (step S505), and since the result is YES (step S505: YES), the command execution unit 3124S transfers this command to the SRO engine 33S. Thereby this command is executed (step S508), and the command execution unit 3124S deletes this command from the command queue 313S (step S509).

The SRO engine 33S, which received the command from the command execution unit 3124S, reads data A of which employee number is "1" from the data store 4, and stores data A in the transmit buffer 341S. Data A stored in the transmit buffer 341S is transmitted to the command execution client 3C, and is transmitted from the command execution client 3C to the salary calculation batch 21.

Since "10" is set as a number of read-ahead data in the setting information corresponding to the behavior type "SRO", the SRO engine 33S reads ten cases of data A of which employee numbers are "1" to "10", and stores the data in the transmit buffer 341S sequentially.

If data A is stored in the transmit buffer 341S here, the SRO engine 33S sequentially sends data A until the receive buffer 342C of the command execution client 3C becomes full (ten cases). If the receive buffer 342C becomes full, the SRO engine 33S stands by until a space is created in the buffer 342C, and transmits data A after the space is created.

If a command to read data A of which employee numbers are "2" to "10" is entered from the salary calculation batch 21 to the command execution client 3C, data A, which is read-ahead and stored in the receive buffer 342C of the command execution client 3C, is replied to the salary calculation batch 21. As a result, processing speed can be increased.

Then the salary calculation batch 21 of the batch processing board 2 enters a command to write data B of which employee number is "1", out of data B shown in FIG. 3, to the command execution client 3C (step S401).

Then the behavior type decision unit 3122C of the command execution client 3C decides "SWO" as a behavior type of the command to write data B (step S402).

Then the command storage unit 3123C of the command execution client 3C stores the command to write data B to a section of the command queue 313C where priority level is set to "mid-", based on the setting information corresponding to the behavior type "SWO" (step S403).

Then the command execution unit 3124C of the command execution client 3C starts operation, and sets the priority level to "highest" (step S404).

Then the command execution unit 3124C determines whether a command is stored in a section of the command queue 313C where the priority level is set to "highest" (step S405), and since the result is NO (step S405: NO), the command execution unit 3124C decreases the priority level to "high" (step S407).

Then the command execution unit 3124C determines whether a command stored in a section of the command queue 313C where the priority level is set to "high" (step S405), and since the result is NO (step S405: NO), the command execution unit 3124C decreases the priority level to "mid-" (step S407).

Then the command execution unit 3124C determines whether a command is stored in a section of the command queue 313C where the priority level is set to "mid-" (step S405), and since the result is YES (step S405: YES), the command execution unit 3124C transfers this command to the SWO engine 35C. Thereby this command is executed (step S408), and the command execution unit 3124C deletes this command from the command queue 313C (step S409).

The SWO engine 35C, which received the command from the command execution unit 3124C, stores this command in the transmit buffer 361C. The command stored in the transmit buffer 361C is transmitted to the command execution server 3S.

Then the behavior type decision unit 3122S of the command execution server 3S decides "SWO" as a behavior type of the command to write data B, since the receive buffer 362S, which stores the command transmitted from the command execution client 3C, is "buffer 6" (step S502).

Then the command storage unit 3123S of the command execution server 3S stores the command to write data B to a section of the command queue 313S where the priority level is set to "mid-", based on the setting information corresponding to the behavior type "SWO" (step S503).

Then the command execution unit 3124S of the command execution server 3S sets the priority level to the initial value "highest" (step S504).

Then the command execution unit 3124S determines whether a command is stored in a section of the command queue 313S where the priority level is set to "highest" (step S505), and since the result is NO (step S505: NO), the command execution unit 3124S decreases the priority level to "high" (step S507).

Then the command execution unit 3124S determines whether a command is stored in a section of the command queue 313S where the priority is set to "high" (step S505), and since the result is NO (step S505: NO), the command execution unit 3124S decreases the priority level to "mid-" (step S507).

Then the command execution unit 3124S determines whether a command is stored in a section of the command queue 313S where the priority is set to "mid-" (step S505), and since the result is YES (step S505: YES), the command execution unit 3124S transfers this command to the SWO engine 35S. Thereby this command is executed (step S508), and the command execution unit 3124S deletes this command from the command queue 313S (step S509).

The SWO engine 35S, which received the command from the command execution unit 3124S, writes data B, of which employee number stored in the receive buffer 362S is "1" in the data store 4, and stores the content of the response to this writing in the transmit buffer 361S. If the content of the response to the writing is stored in the transmit buffer 361S, the SWO engine 35S transmits the content of the response to the command execution client 3C. Then the content of the response is transmitted from the command execution client 3C to the salary calculation batch 21.

The operation to assign priority to processing having a higher priority level when processings overlap between the behavior engines is the same as the first embodiment, hence the description thereof is omitted here.

As mentioned above, according to the command execution system of the second embodiment, the command execution device is separated into a command execution client and a command execution server, whereby the processing load of the behavior engine can be distributed, and the resource (e.g. CPU, memory) required for batch processing can be decreased. If the data store is distributed, a server holding the distributed data must be detected, therefore load on the batch processing can be decreased by distributing the processing for searching data from the data store and memory.

To control read-ahead processing of data, for example, the command execution server can transmit the read-ahead data by PUSH, when a space is created in the receive buffer of the command execution client, hence the data processing can be controlled without issuing a control command.

By using the contention control function among the communication modules, data processing can be controlled without transmitting a behavior engine control command.

Since the setting information of the command execution client and that of the command execution server can be synchronized, priority levels of batch processings can be controlled even if a plurality of batch processings are distributed and processed in parallel.

Since each batch processing can be independently executed from the other batch processings, an administrator of all the processings can manage the resources based on the priority level of each batch job. For example, if the salary calculation batch and the tax calculation batch are executed simultaneously, priority can be assigned to the data access of the tax calculation batch processing only at the end of a month, thus very meticulous resource adjustment can be implemented.

[Variant Forms]

The above mentioned embodiments are merely examples, and the present invention includes various modifications and application of technologies not explicitly stated in the embodiments. In other words, numerous modifications can be made without departing from the essential spirit and scope of the invention.

For example, information to identify a behavior type is attached to data in each of the above mentioned embodiments, but a method for identifying a behavior type is not limited to this. A behavior type may be defined for each batch processing, for instance.

In the description on each of the above mentioned embodiments, SRO and SWO were used as behavior types, but the behavior types are not limited to SRO and SWO. For example, data of which priority level is low may be written once at random, and if the data size is large, the behaviour type can be defined as RWOL (Random Write Once Large). For example, the behavior engine distributes one data, redundantly writes the data in a plurality of data stores, and sets this data to Read Only once written, so that this data can be only read without being locked, and as a result data handling is optimized.

If there is a specific data that is used for a specific batch job, this data may be defined as a behavior type, and the command execution server 3S may provide an optimum data access method to the command execution client 3C which processes this batch job. For example, data A frequently used for the salary calculation batch, may be stored in the data store 4 close to the command execution client 3C in advance, or data A may be stored with highest priority in the command execution server 3S close to the computer which executes the salary calculation batch.

In each of the above mentioned embodiments, one behavior engine is assigned to one behavior type, but a plurality of behavior engines may be assigned to one behavior type.

In each of the above mentioned embodiments, one communication module is assigned to one behavior engine, but a plurality of communication modules may be assigned to one behavior engine.

For the method of managing the state of the buffer, a notification may be transmitted from the communication modules to the main engine, or the main engine may monitor the communication modules using polling. The method for managing the state of a buffer may be changed according to the state of the load. For example, if a large volume of data is transmitted/received, processing load may be decreased by the main engine monitoring the communication modules using polling, rather than the communication modules notifying events. Therefore in such a case, the management method may be switched to a method of the main engine monitoring the communication modules using polling.

An exemplary advantage according to the present invention, the processing efficiency can be improved.

A part or all of the above mentioned embodiments can be stated according to the following additions. The additions are not for limiting the present invention to the content thereof.

(Supplementary note 1) A command execution device, including: a behavior type decision unit which decides a behavior type indicating the content of data input/output operation, according to the content of data processing executed by an entered command; a command storage unit which refers to setting information set in advance for each of the behavior types, and stores the command in a command queue created for each priority level, based on the priority level included in the setting information; and a command execution unit which fetches, out of commands stored in the command queue, a command stored in a section of the command queue having the highest priority level from the command queue, and executes the command.

(Supplementary note 2) The command execution device according to Supplementary note 1, further including an input/output operation control unit which controls the data input/output operation for each of the behavior types, when the setting information is registered, based on the setting information after the registration; and a generation unit which generates a transmit buffer for storing transmit data resulting from the data input/output operation, and a receive buffer for storing receive data resulting from the data input/output operation.

(Supplementary note 3) The command execution device according to Supplementary note 1 or 2, wherein the setting information includes at least, for each of the behavior types, a data size of the transmit data resulting from the data input/output operation, priority level of transmit processing resulting from the data input/output operation, data size of receive data due to the data input/output operation, and priority level of receive processing resulting from the data input/output operation respectively.

(Supplementary note 4) The command execution device according to Supplementary note 3, wherein the setting information further includes the number of read-ahead data when the behavior type is a behavior type indicating sequential read-ahead processing.

(Supplementary note 5) The command execution device according to any one of Supplementary notes 1 to 4, wherein the behavior type decision unit decides the behavior type based on behavior type identification information included in data used for the data processing.

(Supplementary note 6) A command execution system including a client and a server, wherein the client has: a behavior type decision unit which decides a behavior type indicating the content of data input/output operation, according to the content of data processing executed by an entered command; a first command storage unit which refers to setting information set in advance for each of behavior types, and stores the command in a command queue created for each priority level based on the priority level included in the setting information; and a command transmit unit which fetches, out of commands stored in the command queue by the first command storage unit, a command stored in a section of the command queue having the highest priority level from the command queue, and transmits the command to the server, and the server has: a command receive unit which receives the command transmitted from the client; a second command storage unit which stores the received command in a section of the command queue, created for each of the priority level, based on the priority level corresponding to the received command; and a command execution unit which fetches, out of commands stored in the command queue by the second command storage unit, a command stored in a section of the command queue having the highest priority level from the command queue, and executes the command.

(Supplementary note 7) The command execution system according to Supplementary note 6, wherein the client further has: a transmit/receive operation control unit which controls a data transmit/receive operation for each of the behavior types, when the setting information is registered, based on the setting information after the registration; and a first generation unit which generates a transmit buffer for storing transmit data resulting from the data transmit/receive operation, and a receive buffer for storing receive data resulting from the data transmit/receive operation respectively, and the server further has: an input/output operation control unit which controls the data input/output operation for each of the behavior types, when the setting information is registered, based on the setting information after the registration; and a second generation unit which generates a transmit buffer for storing transmit data resulting from the data input/output operation, and a receive buffer for storing receive data resulting from the data input/output operation respectively.

(Supplementary note 8) The command execution system according to Supplementary note 6 or 7, wherein the setting information includes at least, for each of the behavior types, a data size of the transmit data resulting from the data transmit/receive operation or data input/output operation, priority level of transmit processing resulting from the data input/output operation, data size of receive data resulting from the data transmit/receive operation or data input/output operation, and priority level of receive processing resulting from the data transmit/receive operation or data input/output operation respectively.

(Supplementary note 9) The command execution system according to Supplementary note 8, wherein the setting information further includes the number of read-ahead data when the behavior type is a behavior type indicating sequential read-ahead processing.

(Supplementary note 10) The command execution system according to any one of Supplementary notes 6 to 9, wherein the behavior type decision unit decides the behavior type based on behavior type identification information included in data used for the data processing.

(Supplementary note 11) A command execution method, including: a behavior type decision step of deciding a behavior type indicating the content of data input/output operation, according to the content of the data processing executed by an entered command; a command storage step of referring to setting information set in advance for each of the behavior types and storing the command in a command queue created for each priority level based on the priority level included in the setting information; and a command execution step of fetching, out of commands stored in the command queue, a command stored in a section of the command queue having the highest priority level from the command queue, and executing the command.

(Supplementary note 12) A command execution method for controlling a command execution system having a client and a server, wherein the client includes: a behavior type decision step of deciding a behavior type indicating the content of a data input/output operation, according to the content of data processing executed by an entered command; a first command storage step of referring to setting information set in advance for each of the behavior types and storing the command in a command queue created for each priority level, based on the priority level included in the setting information; and a command transmit step of fetching, out of commands stored in the command queue in the first command storage step, a command stored in a section of the command queue having the highest priority level from the command queue, and transmitting the command to the server, and the server includes: a command receive step of receiving the command transmitted from the client; a second command storage step of storing the received command in a section of the command queue created for each of the priority levels, based on the priority level corresponding to the received command; and a command execution step of fetching, out of commands stored in the command queues in the second command storage step, a command stored in section of the command queue having the highest priority level from the command queue, and executing the command.

(Supplementary note 13) A command execution program, for having a computer execute each of the steps according to Supplementary note 11 or 12.

I claim:

1. A command execution device, comprising:
    a behavior type decision unit which decides a behavior type for data based on a content of a data input/output operation and a data processing command, wherein the behavior type comprises at least one of a sequential read and a sequential write;
    a command storage unit which stores the data processing command in a command queue, wherein a priority level is created for the data processing command based on a priority level in setting information set in advance for the behavior type;
    a command execution unit which executes the data processing command stored in a section of the command queue based on the priority level; and
    a generation unit which controls the data input/output operation for the behavior type and generates, based on the setting information set before the initiation of data processing, a transmit buffer that stores transmit data resulting from the data input/output operation, and a receive buffer that stores receive data resulting from the data input/output operation;
    wherein the setting information further comprises at least one of a data size of the transmit data resulting from the data input/output operation, a priority level of transmit processing resulting from the data input/output operation, a data size of receive data resulting from the data input/output operation, and a priority level of receive processing resulting from the data input/output operation.

2. The command execution device according to claim 1, wherein the setting information further comprises the number of read-ahead data when the behavior type is a-sequential read.

3. The command execution device according to claim 1, wherein the behavior type decision unit decides the behavior type based on behavior type identification information included in data used for the data processing.

4. A command execution system comprising a client and a server, wherein
    the client comprises:
        a behavior type decision unit which decides a behavior type for data based on a content of a data input/output operation and a data processing command, wherein the behavior type comprises at least one of a sequential read and a sequential write;
        a first command storage unit which stores the data processing command in a command queue, wherein a priority level is created for the data processing command based on a priority level in setting information set in advance for the behavior type;

a command transmit unit which receives a data processing command stored in a section of the command queue based on the priority level, and transmits the data processing command to the server;

a first generation unit which controls the data input/output operation for the behavior type, and generates, based on the setting information set before the initiation of data processing, a transmit buffer that stores transmit data resulting from the data transmit/receive operation, and a receive buffer that stores receive data resulting from the data transmit/receive operation, and the server comprises:

a command receive unit which receives the data processing command transmitted from the client;

a second command storage unit which stores the received command in a section of the command queue based on the priority level corresponding to the received command;

a command execution unit which executes the data processing command stored in a section of the command queue of the second command storage unit based on the priority level; and a second generation unit which controls the data input/output operation for the behavior type, and generates, based on the setting information set before the initiation of data processing, a transmit buffer that stores transmit data resulting from the data input/output operation, and a receive buffer that stores receive data resulting from the data input/output operation, wherein the setting information further comprises at least one of a data size of the transmit data resulting from the data transmit/receive operation or data input/output operation, a priority level of transmit processing resulting from the data input/output operation, a data size of receive data resulting from the data transmit/receive operation or data input/output operation, and a priority level of receive processing resulting from the data transmit/receive operation or data input/output operation.

5. The command execution system according to claim 4, wherein the setting information further comprises the number of read-ahead data when the behavior type is a-sequential read.

6. The command execution system according to claim 4, wherein the behavior type decision unit decides the behavior type based on behavior type identification information included in data used for the data processing.

7. A command execution method, comprising:

deciding a behavior type for data based on a content of a data input/output operation and a data processing command, wherein the behavior type comprises at least one of a sequential read and a sequential write;

storing the data processing command in a command queue, wherein a priority level is created for the data processing command based on a priority level in setting information set in advance for the behavior type;

receiving a data processing command, for processing at a server, stored in a section of the command queue based on the priority level;

controlling the data input/output operation for the behavior type, and generating, based on the setting information set before the initiation of data processing, a transmit buffer that stores transmit data resulting from the data transmit/receive operation, and a receive buffer that stores receive data resulting from the data transmit/receive operation respectively;

wherein the setting information further comprises at least one of a data size of the transmit data resulting from the data input/output operation, a priority level of transmit processing resulting from the data input/output operation, a data size of receive data resulting from the data input/output operation, and a priority level of receive processing resulting from the data input/output operation.

8. A command execution method comprising:

receiving a data processing command transmitted from a client;

storing the received command in a section of the command queue, wherein a priority level is created for each data processing command based on a priority level in setting information set in advance for a behavior type from data using content of data input/output operation, wherein the behavior type comprises at least one of a sequential read and a sequential write; and executing a data processing command stored in a section of the command queue based on the priority level; and controlling the data input/output operation for the behavior type, and generating, based on the setting information set before the initiation of data processing, a transmit buffer that stores transmit data resulting from the data input/output operation, and a receive buffer that stores receive data resulting from the data input/output operation respectively;

wherein the setting information further comprises at least one of a data size of the transmit data resulting from the data input/output operation, a priority level of transmit processing resulting from the data input/output operation, a data size of receive data resulting from the data input/output operation, and a priority level of receive processing resulting from the data input/output operation.

9. A non-transitory computer-readable storage medium storing a computer program of instructions configured to be readable by at least one computer processor for instructing the at least one computer processor to execute a computer process for performing the method of claim 7.

10. A non-transitory computer-readable storage medium storing a computer program of instructions configured to be readable by at least one computer processor for instructing the at least one computer processor to execute a computer process for performing the method of claim 8.

11. A processing apparatus for batch processing, comprising:

at least one processor configured to determine a behavior type for data identified for processing, wherein the behavior type comprises at least one of a sequential read and a sequential write, and wherein the behavior type is associated with the data in advance of the processing; and at least one memory configured to provide the at least one processor with instructions to store setting information associated with the data identified for processing, wherein the setting information comprises the behavior type determined by the at least one process and a priority level;

wherein the at least one processor is further configured to:

execute a command for processing the data based on a highest priority level;

control a data input/output operation for data based on the behavior type; and generate, based on the setting information set, a transmit buffer that stores transmit data associated with the data input/output operation and a receive buffer that stores receive data associated with the data input/output operation; and wherein the setting information further comprises at least one of: a data size of the transmit data associated with the data input/output operation, a priority level of transmit processing information associated with the data input/output operation, a data size of receive data associated with the data input/output operation, and a priority level of receive processing information associated with the data input/output operation.

12. The apparatus of claim 11, wherein the setting information further comprises a number of read-ahead data in the event the behavior type is a sequential read.

13. The apparatus of claim 11, wherein the at least one processor is further configured to determine the behavior type based on behavior type identification information in data used for processing.

* * * * *